(12) United States Patent
Marru et al.

(10) Patent No.: US 11,619,787 B1
(45) Date of Patent: Apr. 4, 2023

(54) EMBEDDED STRENGTH MEMBER FOR OPTICAL FIBER CABLES AND MANUFACTURING METHOD THEREOF

(71) Applicant: Sterlite Technologies Limited, Gurugram (IN)

(72) Inventors: Pramod Marru, Gurugram (IN); Aparna Nath, Gurugram (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/702,713

(22) Filed: Mar. 23, 2022

(30) Foreign Application Priority Data

Dec. 28, 2021 (IN) .............................. 202111061170

(51) Int. Cl.
*G02B 6/38* (2006.01)
*G02B 6/44* (2006.01)

(52) U.S. Cl.
CPC ......... *G02B 6/3889* (2013.01); *G02B 6/4477* (2013.01)

(58) Field of Classification Search
CPC ............................ G02B 6/3889; G02B 6/4477
USPC ......................................................... 385/103
See application file for complete search history.

(56) References Cited

U.S. PATENT DOCUMENTS

| 5,146,529 A * | 9/1992 | Mizutani | ................ G02B 6/443 385/103 |
| 5,706,382 A * | 1/1998 | Smith | .................... H01B 7/183 385/103 |
| 6,901,192 B2 * | 5/2005 | Wells | ................... G02B 6/4432 385/103 |

* cited by examiner

*Primary Examiner* — Sung H Pak
(74) *Attorney, Agent, or Firm* — Steven R. Fairchild; Arun Kishore Narasani

(57) ABSTRACT

A strength member (202, 302, 402) for use in an optical fiber cable (200, 300, 400) and manufacturing method thereof. The strength member comprises a plurality of reinforced yarns and one or more layers of epoxy resin over the plurality of reinforced yarns, wherein the one or more layers of epoxy resin have a modified surface such that a strength member friction coefficient is between 0.3 to 0.5. The strength member friction coefficient is measured between a surface of a sheath (204, 304, 404) of the optical fiber cable and the modified surface of the one or more layers of epoxy resin. The one or more layers of epoxy resin are blended with at least one of sand crystals and silicon dioxide powder, wherein concentration of the sand crystals or the silicon dioxide powder in the one or more layers of epoxy resin is 50 to 100 phr (Parts-per-Hundred-Resin).

13 Claims, 5 Drawing Sheets

EMBEDDED STRENGTH MEMBER FOR OPTICAL FIBER CABLES AND MANUFACTURING METHOD THEREOF

TECHNICAL FIELD

The present disclosure relates to optical fiber cables, and in particular, relates to embedded strength member for optical fiber cables and manufacturing method thereof.

BACKGROUND

Optical fiber cables are a critical component of modern communication network across the globe. Strength members are one of the important components of the optical fiber cables. The purpose of the strength members is to provide the optical fiber cables required tensile strength, stiffness, rigidity, and bend resistance. A strength member can be installed either at a core of an optical fiber cable or embedded inside a sheath/jacket of the optical fiber cable.

While embedding the strength member in the sheath of the optical fiber cable, if the embedded strength member is uncoated, the bonding between the embedded strength member and the sheath becomes weak, due to which the strength member may experience piston effect i.e., sliding/movement of the embedded strength member against inner surface of the sheath. Similarly, if the embedded strength member is coated with EAA (Ethylene Acrylic Acid) or EVA (Ethylene-Vinyl Acetate), the bonding between the embedded strength member and the sheath becomes too strong such that a banana peel test may fail as stripping of the embedded strength member from the sheath becomes difficult. Further, due to poor bonding between the embedded strength member and the sheath, the optical fiber cable may fail in water penetration test.

One way to address the aforesaid problem is enhancing roughness over the strength members by carving striations/grooves. However, making striations/grooves requires additional tools. A few prior arts disclose additional solutions to address the above drawbacks, such as a prior art reference "WO2016148895A1" discloses use of polymer material particulate for adhesion control between strength member and sheath and "EP1066224B1" teaches use of inorganic material coated fiber strands making reinforcing members.

However, the above-mentioned solutions are costly. Thus, there exists a need to optimize bonding strength of the embedded strength member with the sheath in a cost-effective manner.

Any references to methods, apparatus or documents of the prior art are not to be taken as constituting any evidence or admission that they formed, or form part of the common general knowledge.

SUMMARY

A primary object of the present disclosure is to provide an embedded strength member for optical fiber cables and manufacturing method thereof.

Another object of the present disclosure is to optimize bonding strength of the embedded strength member with a sheath in a cost-effective manner.

Accordingly, a strength member for use in an optical fiber cable and manufacturing method thereof are provided. In an aspect, the strength member comprises a plurality of reinforced yarns and one or more layers of epoxy resin over the plurality of reinforced yarns. The one or more layers of epoxy resin have a modified surface such that a strength member friction coefficient is between 0.3 to 0.5, wherein the strength member friction coefficient is measured between a surface of a sheath of the optical fiber cable and the modified surface of the one or more layers of epoxy resin. The one or more layers of epoxy resin are blended with at least one of sand crystals and silicon dioxide powder and are cured using ultraviolet curing or thermal curing. The plurality of reinforced yarns comprises a plurality of strength yarns extended longitudinally and one or more cured coating layers of epoxy resin reinforcing the plurality of strength yarns. In another aspect, the manufacturing method includes coating the plurality of strength yarns with the one or more layers of epoxy resin and curing of the one or more layers of epoxy resin, wherein an outermost layer of the one or more layers of epoxy resin has a modified surface such that a strength member friction coefficient is between 0.3 to 0.5, wherein the strength member friction coefficient is measured between a surface of a sheath of the optical fiber cable and the modified surface of the one or more layers of epoxy resin. The concentration of the sand crystals or the silicon dioxide powder in the one or more layers of epoxy resin is 50 to 100 phr (Parts-Per-Hundred-Resin).

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

BRIEF DESCRIPTION OF FIGURE

The invention is illustrated in the accompanying drawings, throughout which like reference letters indicate corresponding parts in the drawings. The invention herein will be better understood from the following description with reference to the drawings, in which.

It should be noted that the accompanying figures are intended to present illustrations of few examples of the present disclosure. The figures are not intended to limit the scope of the present disclosure. It should also be noted that accompanying figures are not necessarily drawn to scale.

DETAILED DESCRIPTION

In the following detailed description of the invention, numerous specific details are set forth in order to provide a thorough understanding of the invention. However, it will be obvious to a person skilled in the art that the invention may be practiced with or without these specific details. In other instances, well known methods, procedures, and components have not been described in detail so as not to unnecessarily obscure aspects of the invention.

Furthermore, it will be clear that the invention is not limited to these alternatives only. Numerous modifications, changes, variations, substitutions, and equivalents will be apparent to those skilled in the art, without parting from the scope of the invention.

The accompanying drawings are used to help easily understand various technical features and it should be understood that the alternatives presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Unlike conventional strength member that has piston effect, fails in banana peeling test or fails in water penetration test, the present disclosure proposes an improved strength member that addresses the above drawbacks in a cost-effective way. That is, the present disclosure helps in optimizing bonding strength of an embedded strength member with a sheath in a cost-effective manner, thereby improving adhesion between the embedded strength member and the sheath. In order to improve adhesion, the present disclosure focuses on optimizing roughness of the embedded strength member with the sheath using sand and/or SiO2.

Figure 1:
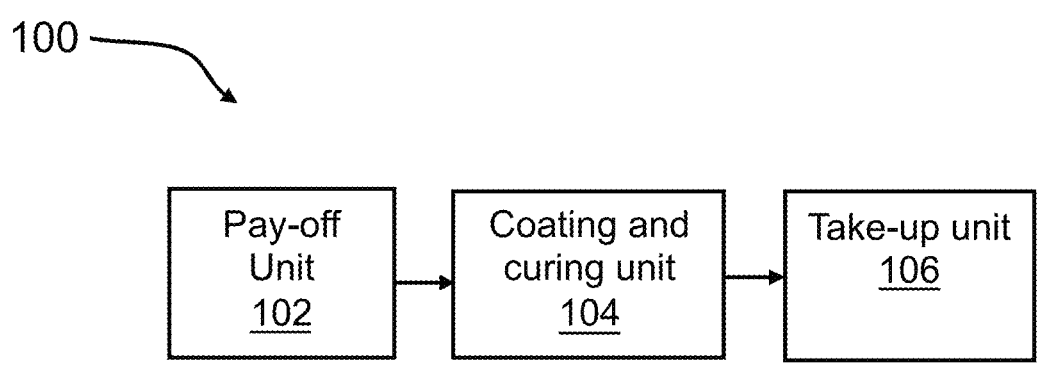
FIG. 1 illustrates a system for manufacturing a strength member.

FIG. 1 illustrates a system 100 for manufacturing a strength member. The system 100 may include a pay-off unit 102, a coating and curing unit 104 and a take-up unit 106. The pay-off unit 102 may be a rotating platform, vertical axis flyer type pay-off unit, horizontal axis flyer type pay-off unit, high speed pay-off unit, for example. The pay-off unit 102 is suitable to continually pay-off a plurality of strength yarns to the coating and curing unit 104. The plurality of strength yarns may be one of aramid yarns, glass roving yarns (glass yarns) or any suitable yarn known to a person skilled in fiber optic art. The plurality of strength yarns may be extended longitudinally.

The coating and curing unit 104 may include a suitably dimensioned die that is flooded with a coating material for coating/bathing the plurality of strength yarns and may also include a forming and curing die for curing the coated/bathed plurality of strength yarns. In other words, the coating and curing unit 104 may include a resin bath where the plurality of strength yarns is coated with an epoxy resin, which is then passed through the forming and curing die where the plurality of strength yarns is given a desired shape and is cured (as explained below). Though the coating and curing unit 104 has been shown as a single unit, the same may be separate units without limiting the scope of the present disclosure.

The coating material may be a blend of an epoxy resin and a powdered material. In general, epoxy resins (also known as polyepoxides) are a class of reactive prepolymers and polymers containing epoxide groups. The epoxy resins may be reacted (cross-linked) either with themselves through a catalytic homo-polymerisation, or with other co-reactants such as, but not limited to, polyfunctional amines, acids, acid anhydrides, phenols, alcohols, and thiols. The co-reactants are known as hardeners or curatives and the cross-linking reaction is known as curing.

Initially, the plurality of strength yarns may be bathed/coated with the epoxy resin and subsequently curing may be performed by the coating and curing unit 104. Typically, curing is a process that produces toughening or hardening of a material/polymer by cross-linking of polymer chains. The epoxy resin may be cured using thermal/heat or UV (ultraviolet) curing. The above process of coating and curing may be repeated. That is, after a first round of coating and curing, the coating and curing unit 104 may perform a second round of bathing/coating using the epoxy resin and curing of the plurality of strength yarns coated with the epoxy resin. The above two stages (rounds) may form a plurality of reinforced yarns comprising the plurality of strength yarns extended longitudinally and one or more cured coating layers of the epoxy resin reinforcing the plurality of strength yarns. Lastly, the coating and curing unit 104 may perform the curing followed by bathing of the plurality of reinforced yarns with a blend of the epoxy resin and the powdered material, thereby forming one or more layers of the epoxy resin (an outermost layer) over the plurality of reinforced yarns. In all the steps, the bathing may be, but not limited to, wet bathing.

To sum up, after the first and second wet baths of the epoxy resin and curing, the powdered material may be blended with the epoxy resin in the third wet bath, thereby resulting in the strength member as proposed by the present disclosure.

Alternatively, blending of the powdered material in the epoxy resin may be done in the first wet bath, the second wet bath or any suitable combination of wet baths.

The powdered material may be at least one of sand crystals and silicon dioxide (SiO2) powder, wherein the sand crystals may have a largest dimension less than 700 microns and the silicon dioxide powder may have a largest dimension less than 300 microns. The powdered material may be blended with a phr (Parts per Hundred Resin) of 50 to 100. That is, concentration of the sand crystals or the SiO2 powder in the one or more layers of the epoxy resin is 50 to 100 phr.

Lastly, the coated and cured strength member may be taken up by the take-up unit 106.

Figure 2:
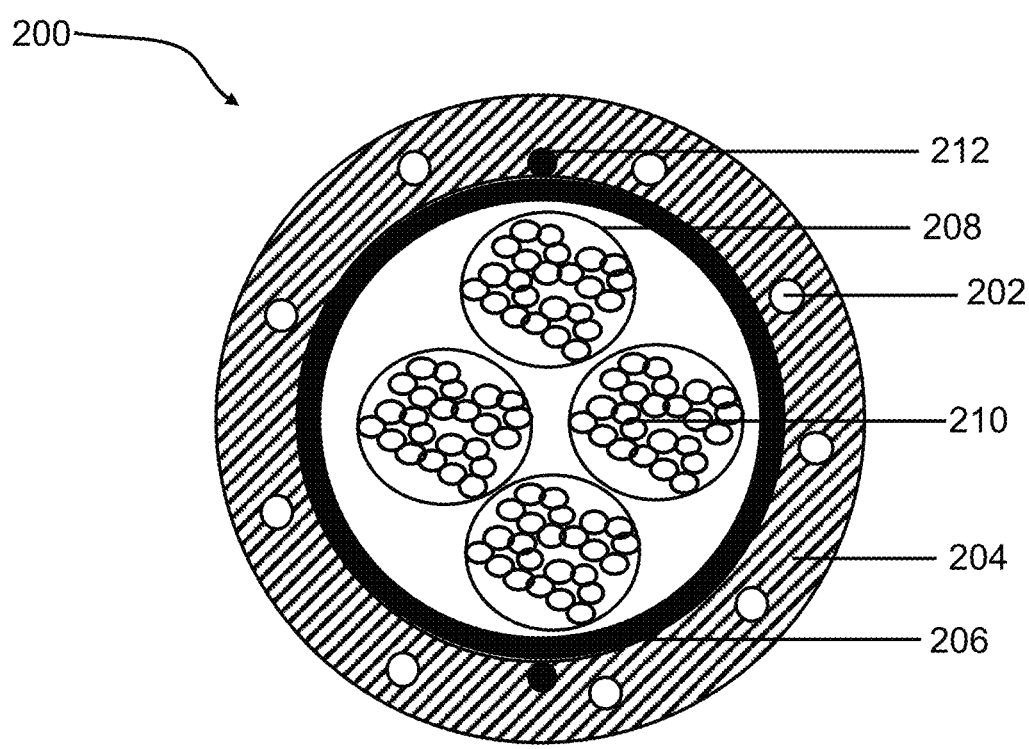
FIG. 2 to FIG. 4 illustrate exemplary optical fiber cables with a plurality of strength members embedded in an outer layer.
Figure 3:
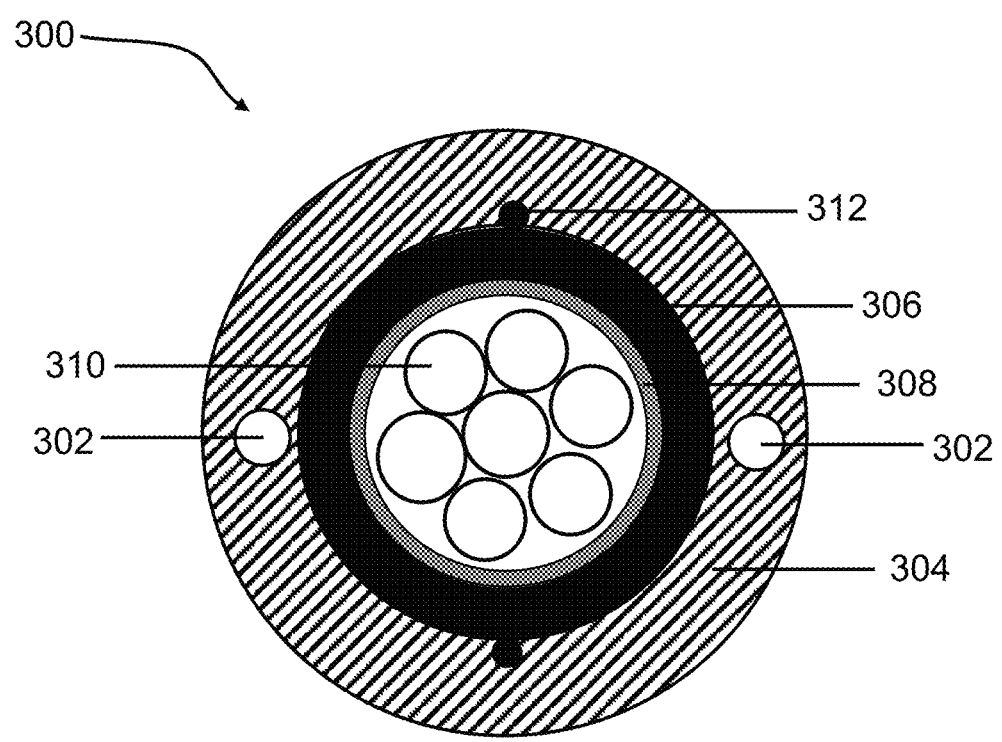
Figure 4:
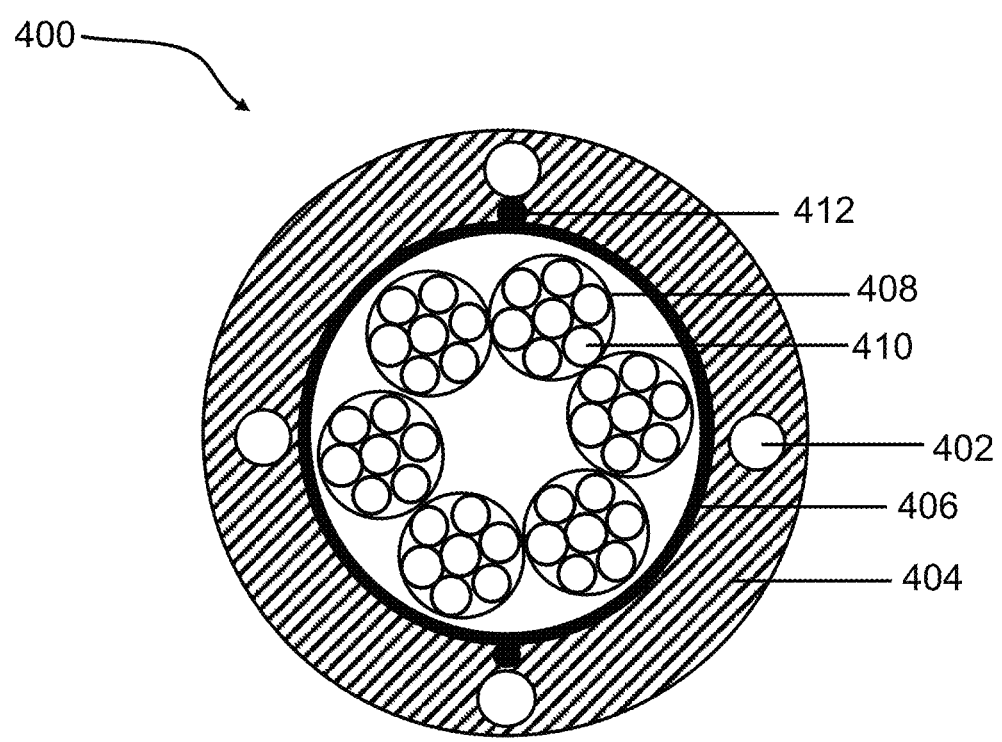

FIG. 2 to FIG. 4 illustrate exemplary optical fiber cables with a plurality of strength members embedded in an outer layer (i.e., sheath). Particularly, an optical fiber cable 200, 300, 400 may comprise one or more optical transmission elements 210, 310, 410, a first layer 206, 306, 406, a sheath 204, 304, 404, a plurality of strength members 202, 302, 402 and one or more rip cords 212, 312, 412.

The one or more optical transmission elements (or optical fibers) 210, 310, 410 may be present in form of, but not limited to, a group of loose optical fibers, a group of optical fiber ribbons or a stack of optical fiber ribbons, a group of rollable ribbons, a group of corrugated ribbons, a group of partially bonded optical fiber ribbons, a group of flat ribbons. Generally, an optical fiber refers to a medium associated with transmission of information over long distances in the form of light pulses. The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.B3 or G.652.D or another suitable category. The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis.

The optical fiber may be a bend insensitive fiber that has less degradation in optical properties or less increment in optical attenuation during bending of the optical fiber cable. Thus, the bend insensitive fiber further helps to maintain the optical properties during multiple winding/unwinding operations of the optical fiber cable. The optical fibers may be coloured fiber. The optical fiber may be a single-core optical fiber, a multi-core optical fiber, a single-mode optical fiber, a multimode optical fiber, or the like. The single mode optical fiber carries only a single mode of light, and the multimode optical fiber carries multiple modes of light to propagate. The multicore optical fibers comprise of multiple cores as opposed to the single-core optical fiber that comprise only a single core.

A core of the optical fiber cable 300 may be a uni-tube/monotube design, wherein a fiber carrying element 308, such as a single buffer tube or loose tube, may carry the one or more optical transmission elements 310 (as shown in FIG. 3). Alternatively, a core of the optical fiber cable 400 may be a multitube design, wherein each of two or more fiber carrying elements 408, such as two or more buffer tubes or loose tubes, may carry the one or more optical transmission elements 410 (As shown in FIG. 4). A buffer tube is used in an optical fiber cable to provide mechanical isolation and protection to the optical transmission elements from physical damages. Alternatively, the core may comprise one or more optical fiber ribbon bundles 208 (as shown in FIG. 2), wherein an optical fiber ribbon bundle is a group of a plurality of optical fiber ribbons arranged/grouped together using one or more binders. That is, multiple individual optical fiber ribbons are stacked or grouped into a bundle to form the optical fiber ribbon bundle. An optical fiber ribbon includes a plurality of optical fibers arranged together using a matrix material. The optical fiber ribbon may be formed by intermittently or continuously bonding the plurality of optical fibers with the matrix material that imparts a bending and rolling capability along a width of the optical fiber ribbon.

In short, the one or more optical transmission elements 210, 310, 410 may be encapsulated in one or more buffer tubes 308, 408 (FIG. 3 and FIG. 4) or one or more binders 208 (FIG. 2) to form the core. The one or more buffer tubes 308, 408 may be made up of, but not limited to, PBT (polybutylene terephthalate), polypropylene (PP), polyamide, thermoplastic material, or a combination of any of suitable material.

The core may be surrounded by the first layer 206, 306, 406. The first layer 206, 306, 406 may be composed of water blocking tape (WBT), aramid yarns, glass roving yarns, water swellable yarns, or any other suitable material.

The first layer 206, 306, 406 may be surrounded by the sheath 204, 304, 404. Usually, sheathing (extrusion) is done at a high temperature (preferably more than 100° C.). The sheathing is a process of squeezing a molten sheathing material through a funnel of a die as the core runs through the center. The sheathing material for the sheath 204, 304, 404 may include, but not limited to, polyvinylchloride, polyethylene (such as High Density Poly Ethylene (HDPE), Medium Density Poly Ethylene, and Low Density Poly Ethylene), polyurethane, thermoplastic rubber/elastomer, thermoplastic chlorinated polyethylene, Low Smoke Zero Halogen (LSZH) or combination thereof.

The sheath 204, 304, 404 may comprise a plurality of strength members 202, 302, 402 embedded in it. Each of the plurality of strength members 202, 302, 402 is formed by the above procedure as explained in FIG. 1. Each of the plurality of strength members 202, 302, 402 may comprise the plurality of reinforced yarns and the one or more layers of the epoxy resin over the plurality of reinforced yarns, wherein the one or more layers of the epoxy resin are the blend of the epoxy resin and at least one of sand crystals and silicon dioxide powder as described above. That is, herein, the one or more layers of the epoxy resin are the outermost layer over the plurality of reinforced yarns that are the blend of the epoxy resin and the powdered material.

The one or more layers of the epoxy resin has a modified surface such that a strength member friction coefficient is between 0.3 to 0.5. The strength member friction coefficient is measured between a surface of the sheath 204, 304, 404 of the optical fiber cable 200, 300, 400 and the modified surface of the one or more layers of the epoxy resin.

In order to measure friction coefficient (or coefficient of friction) (CoF), a strength member is placed above a sheath material sample mounted straight on a clamping device and the clamping device is lifted gradually from one end while a second end is fixed. An angle a with the horizontal at which the strength member starts to slide against the surface of the sheath is measured. The coefficient of friction is calculated as: $CoF=\tan(\alpha)$.

Advantageously, the strength member obtained by the proposed disclosure provides mechanical strength, rigidity, and stiffness to the optical fiber cable. Further, blending of the powdered material such as sand particulates and/or SiO2 powder in the epoxy resin increases roughness of the embedded strength member(s), therefore increases the CoF between the embedded strength member(s) and the sheath. Such increase in the CoF optimizes the roughness/friction between the sheath and the embedded strength member(s) due to which the adhesion between the sheath and the embedded strength member(s) is optimized. Further, the powdered materials such as sand and SiO2 are abundant and cost-effective materials, thereby making the coating material cost-effective. Furthermore, the strength member obtained by the present disclosure provides predictable break load and excellent crush protection/resistance performance. The crush resistance is an ability of a cable to withstand and/or recover from the effects of a compressive force. The strength member may be made of, but not limited to, FRP (Fiber Reinforced Plastic), ARP (Aramid Reinforced Plastic) or any other suitable dielectric/strength material. The strength member may have a round shape, a flat shape, or any other suitable shape.

The one or more rip cords 212, 312, 412 may be placed in the sheath 204, 304, 404 or between the first layer 206, 306, 406 and the sheath 204, 304, 404 for easy stripping of the sheath 204, 304, 404 and to provide easy access to the core.

Figure 5:
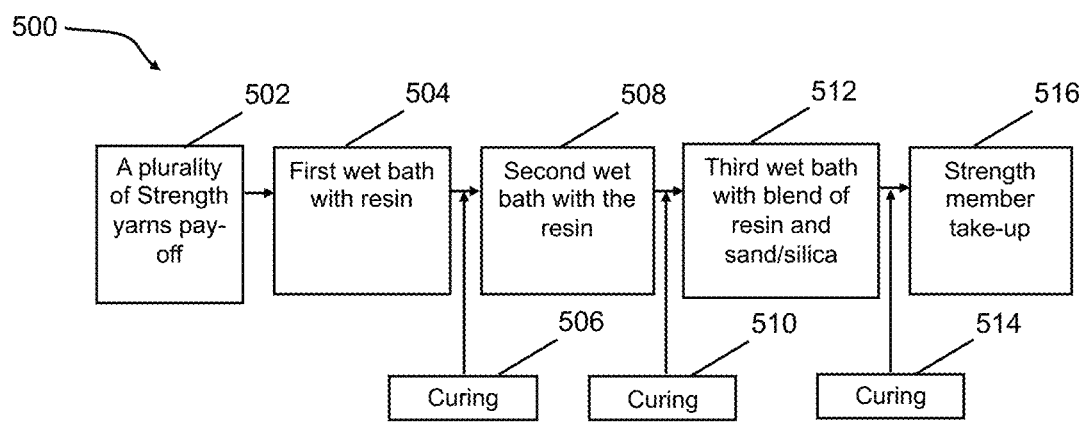
FIG. 5 is a flow chart illustrating a method for manufacturing the strength member.

FIG. 5 is a flow chart 500 illustrating a method for manufacturing the strength member. It may be noted that in order to explain the method steps of the flowchart 500, references will be made to the elements explained in FIG. 1.

At step 502, the pay-off unit 102 may continually pay-off the plurality of strength yarns to the coating and curing unit 104. The coating and curing unit 104 may perform coating of the plurality of strength yarns with the one or more layers of the epoxy resin, wherein the outermost coating layer is the blend of the epoxy resin and the powdered material (as explained above). That is, from step 504 to step 514, the coating and curing unit 104 may be configured to perform coating and curing of the plurality of strength yarns. At step 504, the plurality of strength yarns may be wet bathed with the epoxy resin and at step 506, curing may be performed by the coating and curing unit 104 on the wet bathed plurality of strength yarns. The above process of coating and curing may be repeated. That is, after a first round of bathing and curing, at step 508 and at step 510, the coating and curing unit 104 may perform a second round of wet bathing using the epoxy resin and curing of the plurality of strength yarns respectively. The steps 504 to 510 form the plurality of reinforced yarns. At step 512 and at step 514, the coating and curing unit 104 may perform the curing followed by wet bathing of the plurality of reinforced yarns with the blend of the epoxy resin and the powdered material. The powdered material results in the modified surface of the strength member such that the strength member's coefficient of friction ranges between 0.3 to 0.5 as measured between the surface of the sheath of the optical fiber cable and the surface of the cured coating layer.

Lastly, at step 516, the coated and cured strength member may be taken up by the take-up unit 106. The details of the resultant strength member are already explained in conjunction with FIG. 1, FIG. 2, FIG. 3, and FIG. 4.

The various actions, acts, blocks, steps, or the like in the flow chart 500 may be performed in the order presented, in a different order or simultaneously. Further, in some implementations, some of the actions, acts, blocks, steps, or the like may be omitted, added, modified, skipped, or the like without departing from the scope of the present disclosure.

It will be apparent to those skilled in the art that other alternatives of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific aspect, method, and examples herein. The invention should therefore not be limited by the above described alternative, method, and examples, but by all aspects and methods within the scope of the invention. It is intended that the specification and examples be considered as exemplary, with the true scope of the invention being indicated by the claims.

Conditional language used herein, such as, among others, "can," "may," "might," "may," "e.g.," and the like, unless specifically stated otherwise, or otherwise understood within the context as used, is generally intended to convey that certain alternative include, while other alternatives do not include, certain features, elements and/or steps. Thus, such conditional language is not generally intended to imply that features, elements and/or steps are in any way required for one or more alternatives or that one or more alternatives necessarily include logic for deciding, with or without other input or prompting, whether these features, elements and/or steps are included or are to be performed in any particular alternative. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain alternatives require at least one of X, at least one of Y, or at least one of Z to each be present.

While the detailed description has shown, described, and pointed out novel features as applied to various alternatives, it can be understood that various omissions, substitutions, and changes in the form and details of the devices or algorithms illustrated can be made without departing from the scope of the disclosure. As can be recognized, certain alternatives described herein can be embodied within a form that does not provide all of the features and benefits set forth herein, as some features can be used or practiced separately from others.

We claim:

1. A strength member (202, 302, 402) for use in an optical fiber cable (200, 300, 400), comprising:
   a plurality of reinforced yarns; and
   one or more layers of epoxy resin over the plurality of reinforced yarns, wherein the one or more layers of epoxy resin have a modified surface such that a strength member friction coefficient is between 0.3 to 0.5, wherein the strength member friction coefficient is measured between a surface of a sheath (204, 304, 404) of the optical fiber cable (200, 300, 400) and the modified surface of the one or more layers of epoxy resin.

2. The strength member (202, 302, 402) as claimed in claim 1, wherein the plurality of reinforced yarns comprising:
   a plurality of strength yarns extended longitudinally; and
   one or more cured coating layers of epoxy resin reinforcing the plurality of strength yarns.

3. The strength member (202, 302, 402) as claimed in claim 2, wherein the plurality of strength yarns is one of aramid yarns, glass yarns.

4. The strength member (202, 302, 402) as claimed in claim 1, wherein the one or more layers of epoxy resin are blended with at least one of sand crystals and silicon dioxide powder.

5. The strength member (202, 302, 402) as claimed in claim 4, wherein the sand crystals have a largest dimension less than 700 microns, and the silicon dioxide powder has a largest dimension less than 300 microns.

6. The strength member (202, 302, 402) as claimed in claim 4, wherein concentration of the sand crystals or the silicon dioxide powder in the one or more layers of epoxy resin is 50 to 100 phr (Parts per Hundred Resin).

7. The strength member (202, 302, 402) as claimed in claim 1, wherein the one or more layers of epoxy resin are cured using ultraviolet curing or thermal curing.

8. A method of manufacturing a strength member (202, 302, 402) for an optical fiber cable (200, 300, 400), comprising:
   coating a plurality of strength yarns with one or more layers of epoxy resin; and
   curing of the one or more layers of epoxy resin,
   wherein an outermost layer of the one or more layers of epoxy resin has a modified surface such that a strength member friction coefficient is between 0.3 to 0.5, wherein the strength member friction coefficient is measured between a surface of a sheath (204, 304, 404) of the optical fiber cable and the modified surface of the one or more layers of epoxy resin.

9. The method as claimed in claim 8, wherein the plurality of strength yarns is one of aramid yarns, glass yarns.

10. The method as claimed in claim 8, wherein the outermost layer of the one or more layers of epoxy resin is blended with at least one of sand crystals and silicon dioxide powder.

11. The method as claimed in claim 10, wherein the sand crystals have a largest dimension less than 700 microns, and the silicon dioxide powder has a largest dimension less than 300 microns.

12. The method as claimed in claim 10, wherein concentration of the sand crystals or the silicon dioxide powder in the one or more layers of epoxy resin is 50 to 100 phr (Parts per Hundred Resin).

13. The method as claimed in claim 8, wherein the one or more layers of epoxy resin are cured using ultraviolet curing or thermal curing.

\* \* \* \* \*